(12) United States Patent
Nou (10) Patent No.: US 7,599,794 B2
(45) Date of Patent: Oct. 6, 2009

(54) SYSTEM AND METHOD FOR TRACKING POSITION OF REMOTE VEHICLE USING TELEMATICS SYSTEM

(75) Inventor: Seong Taeg Nou, Icheon-shi (KR)

(73) Assignee: Hyundai Autonet Co., Ltd., Icheon-Shi Kyunki-Do (KR)

( * ) Notice: Subject to any disclaimer, the term of this patent is extended or adjusted under 35 U.S.C. 154(b) by 505 days.

(21) Appl. No.: 11/162,226

(22) Filed: Sep. 1, 2005

(65) Prior Publication Data

US 2006/0122773 A1    Jun. 8, 2006

(30) Foreign Application Priority Data

Dec. 6, 2004    (KR) ................... 10-2004-0102013

(51) Int. Cl.
G01C 21/00    (2006.01)
G08G 1/123    (2006.01)
B60Q 1/00    (2006.01)
B60R 25/10    (2006.01)

(52) U.S. Cl. .................. 701/213; 701/200; 701/206; 701/207; 701/210; 701/32; 340/988; 340/989; 340/991; 340/993; 340/425.5; 340/426.19

(58) Field of Classification Search ............... 701/207, 701/213, 220, 215, 216
See application file for complete search history.

(56) References Cited

U.S. PATENT DOCUMENTS

| 6,282,491 | B1 * | 8/2001 | Bochmann et al. ........... 701/209 |
| 6,741,187 | B2 * | 5/2004 | Flick ........................... 340/989 |
| 6,960,990 | B2 * | 11/2005 | McKibbon ............. 340/426.35 |
| 2002/0115436 | A1 * | 8/2002 | Howell et al. ................ 455/426 |

FOREIGN PATENT DOCUMENTS

| KR | 1020040035290 | 4/2004 |
| KR | 1020040035295 | 4/2004 |
| KR | 1020040035297 | 4/2004 |
| KR | 1020040033101 | 10/2004 |

* cited by examiner

Primary Examiner—Khoi Tran
Assistant Examiner—Bhavesh V Amin
(74) Attorney, Agent, or Firm—IPLA P.A.; James E. Bame (57) ABSTRACT

A system and method for tracking a position of a remote vehicle using a telematics system is provided. The system includes a communication terminal for generating and transmitting a remote position track service request signal, and informing the user of vehicle position information; a service providing center for receiving the remote position track service request signal and transmitting a remote position track service signal, and transmitting the vehicle position information; and a telematics terminal having a GPS (Global Positioning System), and receiving the remote position track service request signal, and detecting a vehicle position using the GPS to generate and transmit the vehicle position information to the service providing center.

6 Claims, 6 Drawing Sheets

SYSTEM AND METHOD FOR TRACKING POSITION OF REMOTE VEHICLE USING TELEMATICS SYSTEM

BACKGROUND OF THE INVENTION

1. Field of the Invention

The present invention relates to a telematics system, and more particularly, to a system and method for tracking a position of a remote vehicle using a telematics system, in which the vehicle position can be tracked at a remote place using a Global Positioning System (GPS) of the telematics system.

2. Description of the Related Art

In recent years, a telematics system is one of technologies attracting attention. The telematics system detects occurrence of vehicle accident or theft, guides a vehicle running path, and provides a vehicle driver with a variety of other information using a mobile communication method and a position tracing method associated with Internet. In other words, the telematics system provides information through a vehicle based on a Global Positioning System (GPS) using a mobile communication system and a GPS satellite. Accordingly, the telematics system is expected to provide a variety of mobile communication services, such as traffic information, countermeasure to an emergency situation, remote vehicle diagnosis, the use of Internet (for example, financial transaction, provision of news, and transmission and reception of e-mail), using the GPS, a wireless communication network and an Internet network.

One of the reasons why the telematics system attracts attention is that it creates a newly conceptive value added service, which is able to maximize a synergy effect by merging an automobile industry with an Information Telecommunication (IT) industry.

Accordingly, a standardization group of telematics is provided. In the standardization group, there are being standardized an operation and a function of each constituent part of the telematics system, a communication protocol between the constituent parts, and services using a communication network.

If a telematics service is realized, a car can be reconstructed through a wire or wireless communication and broadcasting network, using Internet, which is a third space following an office space and a home space, and can be associated with home networking and office automation through a hetero communication and broadcasting network and an intelligent terminal, thereby providing a service for home and office even to the car without interruption.

Together with the spotlight of a telematics technology and the development of the telematics system, a variety of service contents satisfying a user's desire are being required.

SUMMARY OF THE INVENTION

Accordingly, the present invention is directed to a system and method for tracking a position of a remote vehicle using a telematics system that substantially overcomes one or more of the limitations and disadvantages of the conventional art.

An object of the present invention is to provide a system and method for tracking a position of a remote vehicle using a telematics system, in which the vehicle position can be tracked at a remote place using a Global Positioning System (GPS) of the telematics system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a system for tracking a position of a remote vehicle using a telematics system, the system including: a communication terminal for generating and transmitting a remote position track service request signal upon reception of a remote position track service request from a user, and informing the user of vehicle position information upon reception of the vehicle position information responsive to the remote position track service request signal; a service providing center for receiving the remote position track service request signal and transmitting a remote position track service signal, and transmitting the vehicle position information to the communication terminal upon reception of the vehicle position information responsive to the remote position track service request signal; and a telematics terminal having a GPS (Global Positioning System), and receiving the remote position track service request signal, and detecting a vehicle position using the GPS to generate and transmit the vehicle position information to the service providing center.

In another aspect of the present invention, there is provided a method for tracking a position of a remote vehicle using a telematics system having a communication terminal, a service providing center and a telematics terminal, the method including the steps of: when a user inputs a remote position track service request to the communication terminal, generating and transmitting a remote position track service request signal in the communication terminal; in the service providing center, receiving the remote position track service request signal, and transmitting a vehicle position track request signal; in the telematics terminal, receiving the remote position track request signal, detecting a vehicle position, generating a vehicle position information, and transmitting the generated vehicle position information to the service providing center; in the service providing center, receiving the vehicle position information, and transmitting the received vehicle position information to the communication terminal; and in the communication terminal, receiving the vehicle position information and informing the user of the received vehicle position information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to aid in understanding the invention and are incorporated into and constitute a part of this application, illustrate embodiment(s) of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numerals will be used throughout the drawings to refer to the same or like parts.

In the present invention, when a telematics system subscriber has a vehicle stolen, he/she can connect to his/her vehicle using a telematics system and detect a position of the vehicle using a Global Positioning System (GPS) of the telematics system, thereby informing a relevant organization, that is, a police station of vehicle theft and position information.

Figure 1:
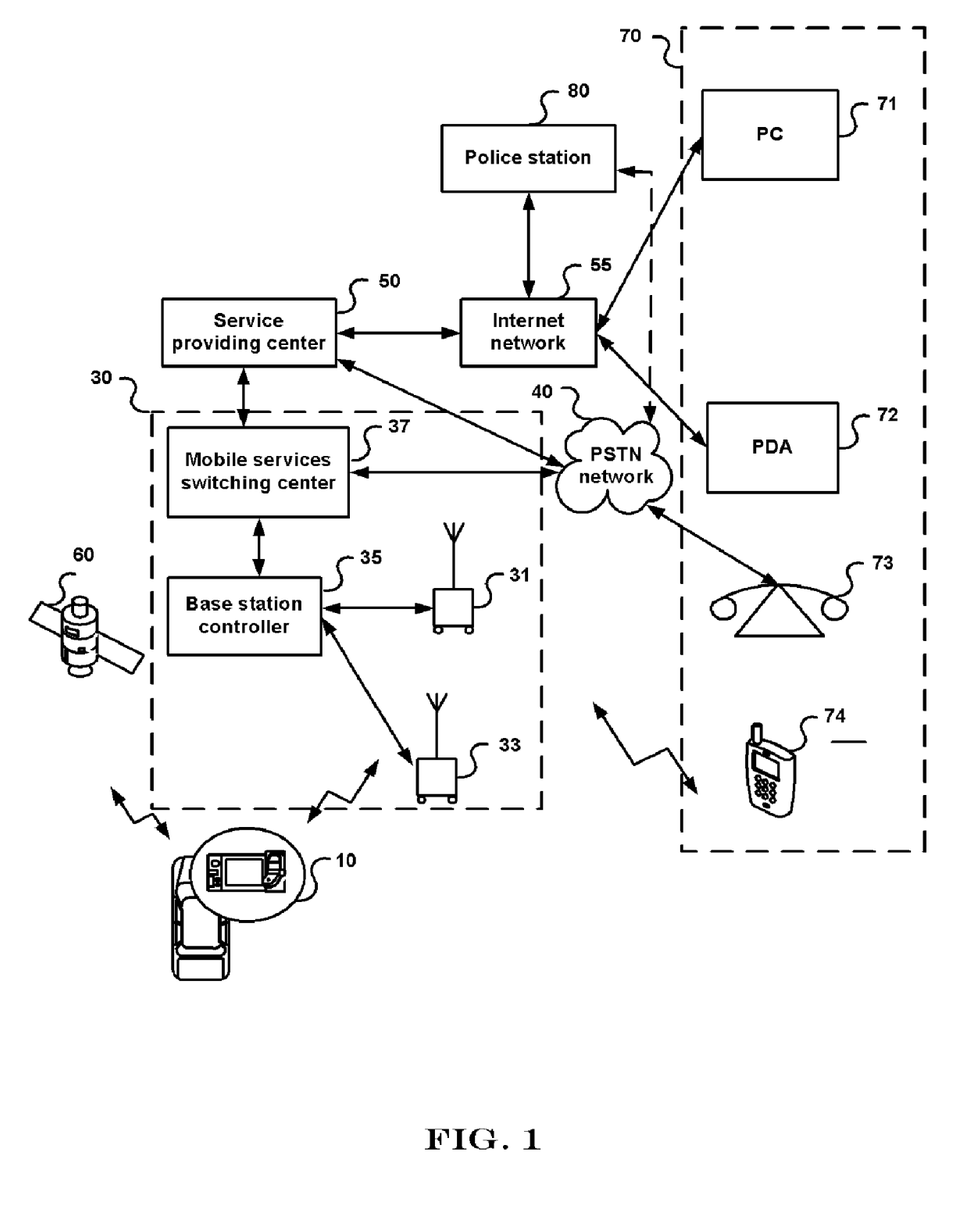
FIG. 1 illustrates a construction of a system for tracking a position of a remote vehicle using a telematics system according to the present invention.

FIG. 1 illustrates a construction of a system for tracking a position of a remote vehicle using the telematics system according to the present invention.

The inventive tracking system using the telematics system includes the telematics terminal 10, a mobile communication network 30, a Public Switching Telecommunication Network (PSTN) 40, a service providing center 50, an Internet network 55, an artificial satellite 60, a communication terminal 70, and a relevant organization 80.

The telematics terminal 10 receives position information from an artificial satellite 60, maps the received position information to a previously stored map data, and displays a car's position on a displaying device such as a Liquid Crystal Display (LCD). Further, even when the telematics terminal 10 receives a position track request signal from the service providing center 50 through the mobile communication network 30, it detects its position and generates position information to transmit the generated position information to the service providing center 50 through the mobile communication network 30. The telematics terminal 10 can be connected with the mobile communication network 30 using a portable mobile communication terminal 10-1, or can be also connected with the mobile communication network 30 using its internally installed wireless communication unit 23. Through the telematics terminal 10, the telematics system subscriber can receive traffic information through the mobile communication network 30, display the received traffic information on the LCD, and receive a service of information such as a current traffic situation.

The service providing center 40 is connected with the mobile communication network 30, the PSTN 40, and the Internet network 55. The service providing center 40 is wireless connected with the telematics terminal 10 through the mobile communication network 30, to receive the vehicle position information from the telematics terminal 10 and transmit the received vehicle position information to the telematics system subscriber through the mobile communication network 30, the PSTN 40, or the Internet network 55 connecting with the telematics system subscriber. The transmitted vehicle position information can be a character, a graphic icon, voice, and the like depending on a type of a communication network connecting with the subscriber. For example, in case where the subscriber connects to the service providing center 40 through the PSTN being a wire communication network, the vehicle position information can be the voice. In case where the subscriber connects to the service providing center 40 through a cell phone or a Portable Digital Assistants (PDA) being a mobile communication terminal, the vehicle position information can be the voice, the character, and/or the graphic icon. Further, the service providing center 40 should have a number of the telematics terminal of each remote vehicle diagnostic service subscriber, and an authentication password and/or a resident registration number for the telematics terminal, to authenticate the subscriber and allow the connection to the corresponding telematics terminal.

The communication terminal 70 can be any one of a Personal Computer (PC) 71 connecting to the service providing center 50 through the Internet network 55, the PDA 72 connecting to the service providing center 50 through the Internet network 55 or the mobile communication network 30, a line telephone set 73 connected to the service providing center 50 through the PSTN 40, and the cell phone 74 connecting to the service providing center 50 through the mobile communication network 30. According to the present invention, the communication terminal 70 receives the vehicle position information from the service providing center 50, and informs a user of the received vehicle position information through the LCD, a monitor or a speaker.

The relevant organization 80 can be the police station and the like. The relevant organization 80 is connected with the service providing center 50 through the Internet network 55, the PSTN 40 or the mobile communication network 30, and receives a vehicle theft notification message from the service providing center 50. At this time, a police officer will be capable of receiving the vehicle theft notification message to confirm the position of the stolen vehicle, and quickly move to the corresponding position.

Figure 2:
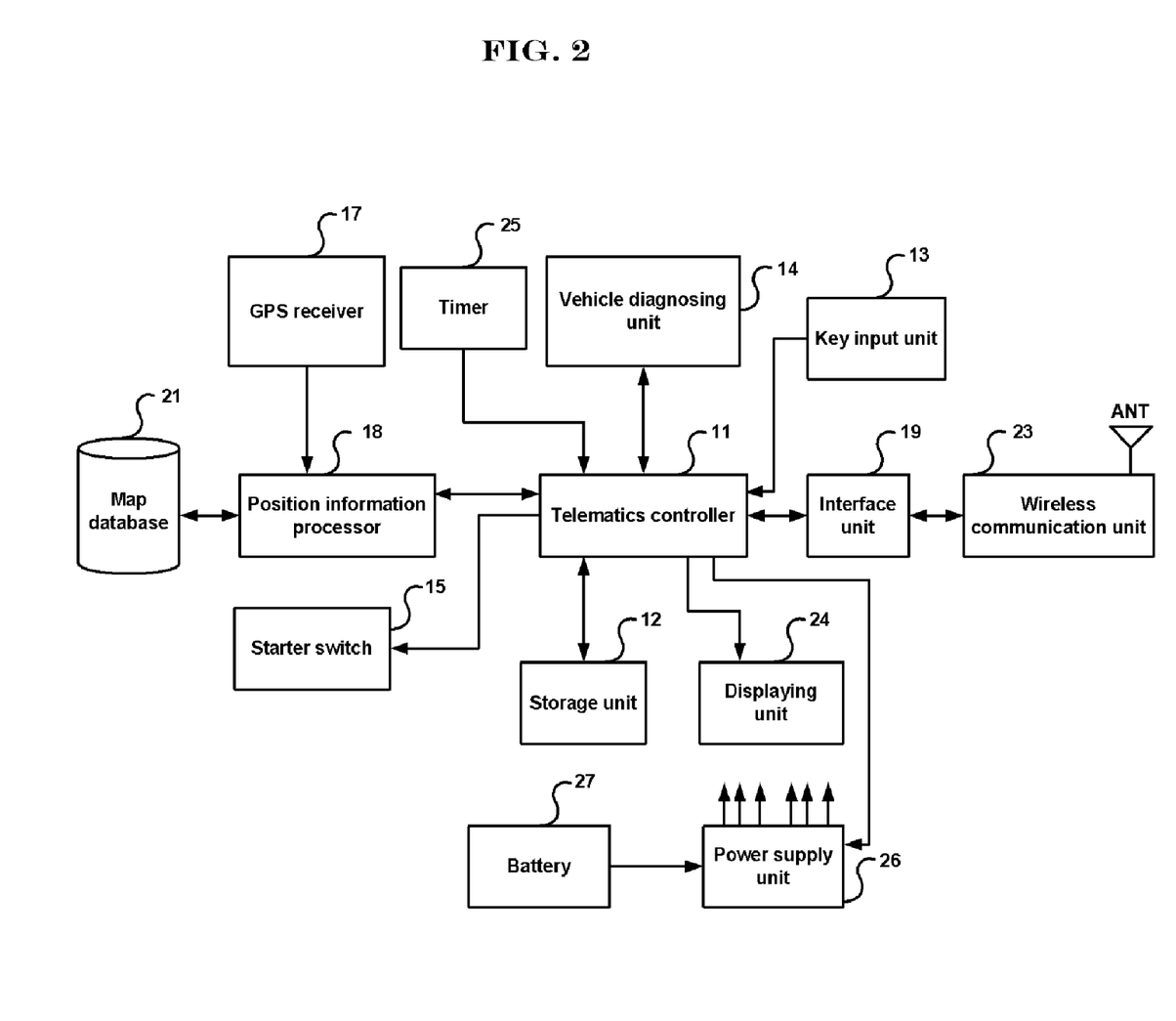
FIG. 2 illustrates a construction of a telematics terminal according to the present invention.

FIG. 2 illustrates a construction of the telematics terminal according to the present invention.

Referring to FIG. 2, a construction and an operation of the telematics terminal will be described below.

The telematics terminal 10 includes a telematics controller 11, a storage unit 12, a key input unit 13, a vehicle diagnosing unit 14, a starter switch 15, a GPS receiver 17, a position information processor 18, an interface unit 19, a map database 21, the wireless communication unit 23, a displaying unit 24, a power supplying unit 26, and a battery 27. In case where the wireless communication unit 23 is a built-in type, the telematics terminal 10 can be configured even without the interface unit 19.

The telematics controller 11 controls a general operation of the telematics terminal 10. The storage unit 12 includes a region for storing a control program for controlling the operation of the telematics terminal 10; a region for temporarily storing data, which is generated during the execution of the control program; and a region for storing a user data, such as a position track unset password, the vehicle diagnostic information, the vehicle position information, and the authentication password, which is used for authentication when a vehicle position is requested.

The key input unit 13 includes a plurality of alphanumeric keys, a function key, a mode key, an end key, a power key, and a remote position track key, and generates key data for the keys. The remote position track key is used to set or unset the vehicle position track, and set the vehicle position track unset password. The remote position track key can be recognized by a combination of other keys for security. The vehicle diagnosing unit 14 detects a status signal of each constituent part of the car from a plurality of sensors, which are positioned at exterior or interior constituent parts of the car, and transmits the detected status signal to the telematics controller 11. The vehicle diagnosing unit 14 can receive the status signal in a direct connection with the plurality of sensors, or can receive the status signal or the vehicle diagnostic information of each constituent part of the car through the ECU or TCU connected with the plurality of sensors. The sensors can be exemplified as a collision sensor for sensing the collision at a front or rear of the car, an airbag sensor for sensing the activation of the airbag when a sensed value of the collision sensor is larger than a predetermined value, a sensor for checking an amount of car's oil, and a sensor for sensing the opening or closing of the window, the door, and the trunk.

The displaying unit 24 displays a variety of information, such as operation mode and state of the telematics system, and the car status, in a graphic or text format, under the control of the telematics controller 11. The displaying unit 24 can employ the LCD and the like.

The timer 25 counts a time, and provides information on the counted time to the telematics controller 11.

The interface unit 19 is connected with a Universal Asynchronous Receiver and Transmitter (UART) (not shown) of the wireless communication unit 23, and wireless connects the telematics terminal 10 with a base station 33 of FIG. 1. In case where the wireless communication unit 23 is a built-in type, the telematics terminal 10 can be configured without the interface unit 19.

The starter switch 15 supplies a power to the vehicle, or starts an engine of the powered vehicle under the control of the telematics controller 11. When the car status is diagnosed, the telematics terminal 10 and the vehicle should be in a powered state. Therefore, the telematics controller 11 should control the starter switch 15 to supply the power to the vehicle and start the engine of the powered vehicle.

The map database 21 stores map data on positional road and building. The GPS receiver 17 receives the position information from the plurality of artificial satellites 60, and outputs the received position information to the position information processor 18. The position information processor 18 receives the position information from the GPS receiver 17, and reads the map data on the position of the received position information from the map database 21, and outputs the read map data to the telematics controller 11.

The power supplying unit 26 receives a power source from the car battery 27, converts the received power source into an operation power source for operating the telematics terminal, and supplies the converted power source to each constituent part. When the power supplying unit 26 receives a power key signal from the key input unit 13, it turns on/off the power source supplied to the telematics terminal 10 under the control of the controller 11.

In case where the inventive telematics controller 11 is set in a position track mode, it does not turn off the power source when receiving the power key signal, and it turns off the power source only when receiving the position track unset password. In detail, even when the power source is turned off, the telematics controller 11 supplies the power source to constituent parts for transmitting the position information according to the present invention. For example, the power source is supplied to the GPS receiver 17, the position information processor 18, the map database 21, the telematics controller 11, the timer 25, the storage unit 12, the key input unit 13, the interface unit 19, and the wireless communication unit 23, and is not supplied to the displaying unit 24, the vehicle diagnosing unit 14, and the starter switch 15. This is to prevent a vehicle thief from becoming aware of being currently tracked in position.

Figure 3:
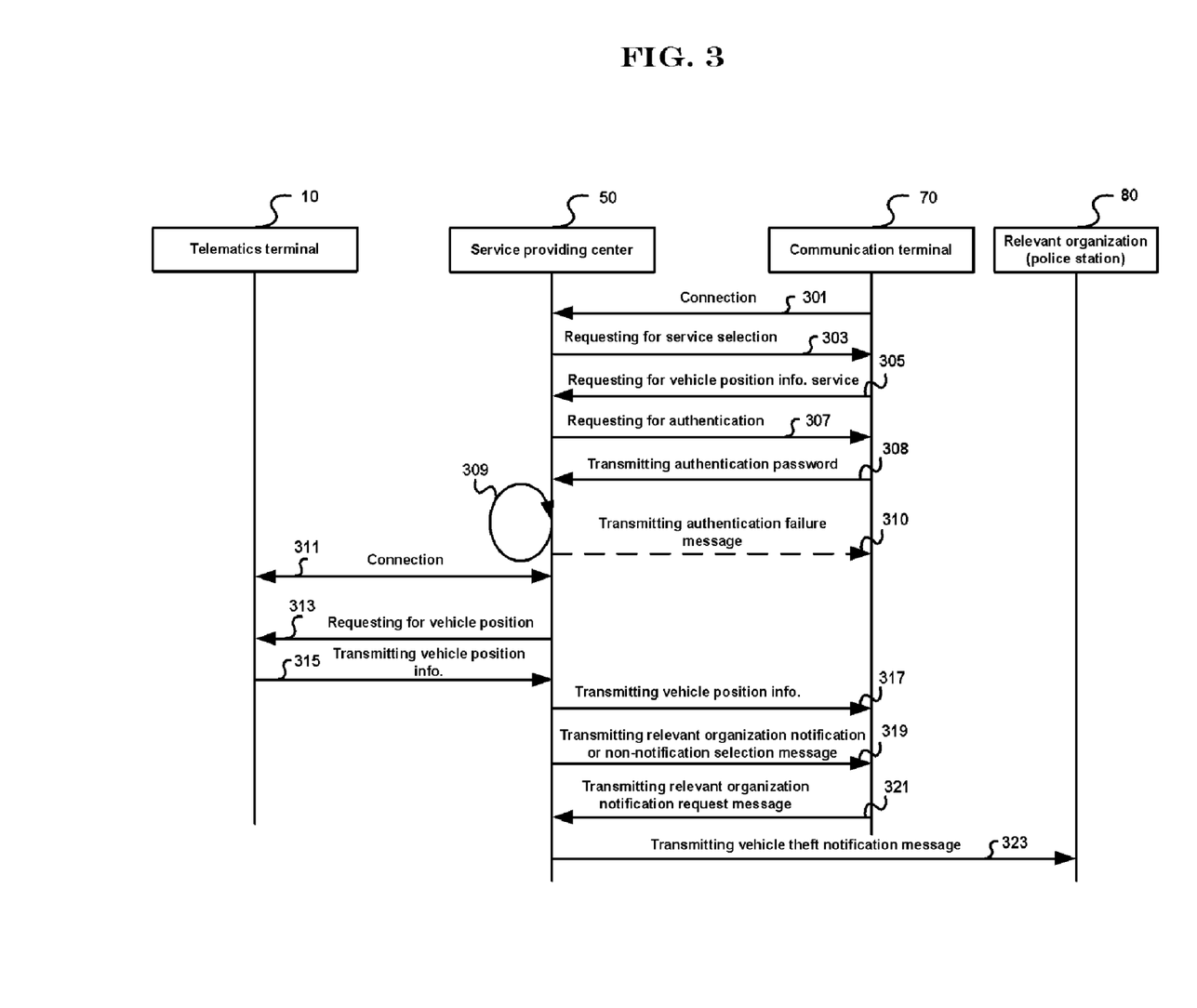
FIG. 3 is a flowchart illustrating a method for tracking a position of a remote vehicle using a telematics system according to the first embodiment of the present invention.

FIG. 3 is a flowchart illustrating a method for tracking the position of the remote vehicle using the telematics system according to the first embodiment of the present invention.

Referring to FIGS. 1 to 3, the inventive method for tracking the vehicle position at the remote place will be described below.

The telematics system subscriber should subscribe to the service providing center 50 for a remote vehicle position track service. The service providing center 50 should receive and hold information on whether or not the user subscribes for the position track service, and an inherent authentication password from the subscriber. When the communication terminal 70 is the line telephone set 73, the inherent authentication password can be a numeric password. When the communication terminal 70 is the PC 71, the PDA 72, and the cell phone 74, the inherent authentication password can be an IDentification (ID) and a password such as a numeral or a character. When the communication terminal 70 is the line telephone set 73, the service providing center 50 uses an Automatic Response System (ARS). It is desirable that additional authentication information such as a resident registration number is requested using the ARS, to reinforce safety.

When the communication terminal 70 receives a service providing center connection command from the subscriber, it connects to the service providing center 50 in Step 301. When the communication terminal 70 is the line telephone set 73, the connection command can be a telephone number of the service providing center 50. When the communication terminal 70 is the Internet, the connection command can be a service request command on a homepage of the service providing center 50.

When the communication terminal 70 connects to the service providing center 50, the service providing center 50 transmits a service selection request signal for in-services in Step 303. The service selection request signal can have a graphic or text format and a voice format, depending on a type of the communication terminal 70. The communication terminal 70 receives the service selection request signal, and checks whether or not to select one of a plurality of services. If it is checked that the position track service is selected, the communication terminal 70 transmits a vehicle position track service request signal to the service providing center 50 through the corresponding network in Step 305. Then, in Step 307, the service providing center 50 transmits an authentication request signal to the communication terminal 70 to determine whether or not the subscriber, who uses the communication terminal 70 transmitting the position track service request signal, is registered. The communication terminal 70 receives the authentication request signal, receives the authentication password from the subscriber, and transmits the received authentication password to the service providing center 50 in Step 309.

The service providing center 50 receives the authentication password, and compares the received authentication password with a previously stored authentication password and determines whether or not they are the same. If it is determined that they are the same, the service providing center 50 connects to the telematics terminal 10 for the subscriber in Step 311. At this time, a request for the connection is performed by the service providing center 50. It is desirable that the service providing center 50 has an inherent identifier for distinguishing itself from others. Whereas, if it is determined that the received authentication password is not the same as the previously stored authentication password, the service providing center 50 transmits an authentication failure message to the communication terminal 70 in Step 310.

Only when the telematics terminal 10 receives an incoming call having its own number including the inherent identifier, it forms a communication path and connects with the service providing center 50.

If the service providing center 50 connects to the telematics terminal 10, it transmits a vehicle position request signal for requesting the vehicle position, to the telematics terminal 10 in Step 313. Then, the telematics terminal 10 receives the vehicle position information through the position information processor 18, and transmits the received vehicle position information to the service providing center 50 in Step 315.

The service providing center 50 receives the vehicle position information from the telematics terminal 10, converts the received vehicle position information into vehicle position track information suitable to the communication terminal 70, which has requested the vehicle position track service, and transmits the converted vehicle position track information to the communication terminal 70 in Step 317. For example, when the communication terminal 70 is the line telephone set 73, the service providing center 50 converts text data of the vehicle position information into voice data, and transmits the converted voice data to the telematics terminal 70. When the communication terminal is the PC 71, the PDA 72 or the cell phone 74, the service providing center 50 converts the vehicle position information into the voice, text or graphic, and transmits the converted voice, text or graphic to the telematics terminal 70.

The communication terminal 70 receives the vehicle position information from the service providing center 50, and informs the subscriber of the vehicle position information in voice, text and/or graphic.

After the transmitting of the vehicle position information, the service providing center 50 transmits the vehicle position information and a relevant organization notification or non-notification selection message for inquiring whether or not to report a theft in Step 319.

Thus, the communication terminal 70 receives the relevant organization notification or non-notification selection message from the service providing center 70, and informs the subscriber of the reception of the notification or non-notification selection message. At this time, when the subscriber selects a relevant organization notification in response to the relevant organization notification or non-notification selection message, the communication terminal 70 generates and transmits a relevant organization notification request message to the service providing center 50 in Step 321.

The service providing center 50 receives the relevant organization notification request message from the communication terminal 70, and transmits a vehicle theft notification message to the relevant organization 80 in Step 323.

Figure 4:
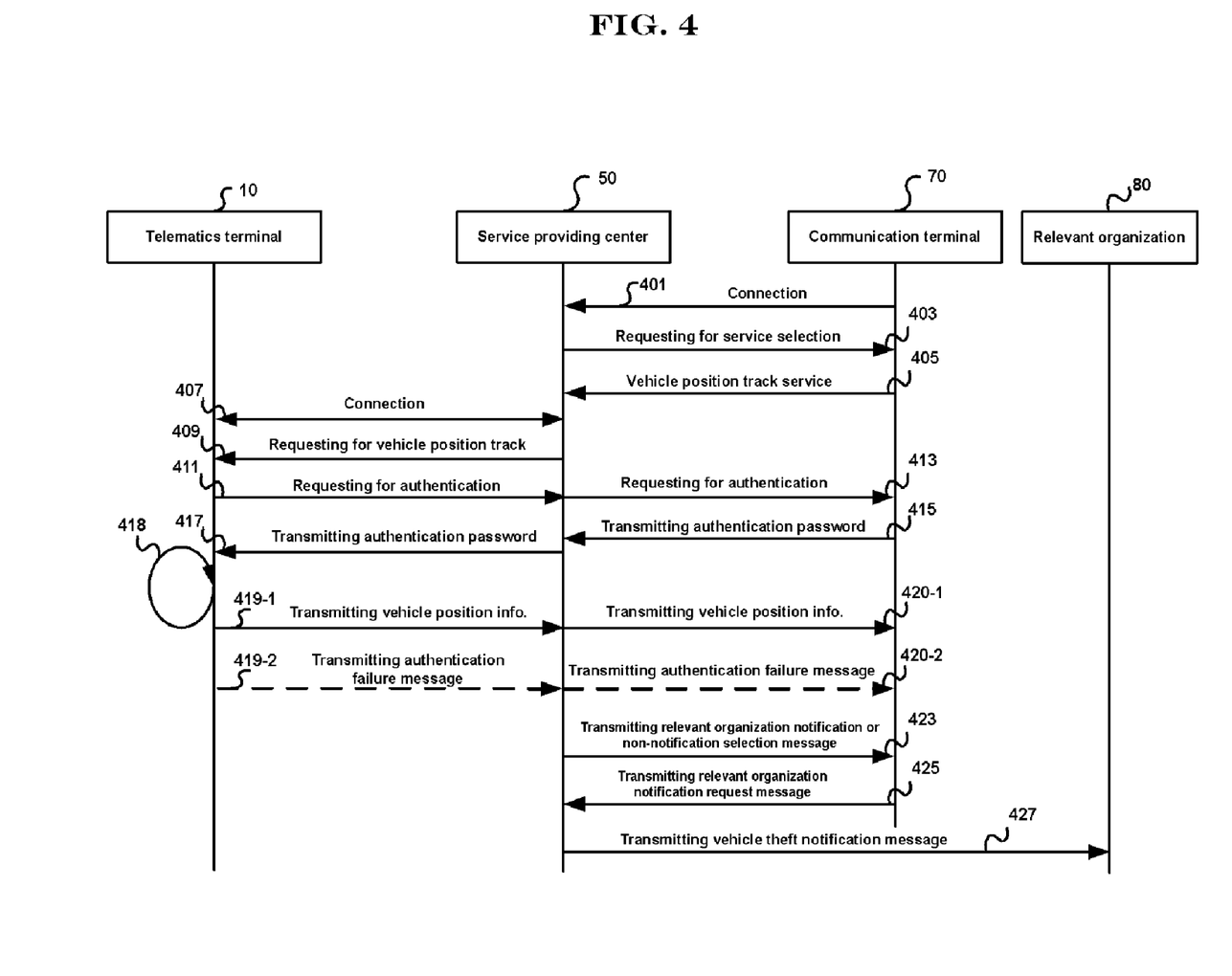
FIG. 4 is a flowchart illustrating a method for tracking a position of a remote vehicle using a telematics system according to the second embodiment of the present invention.

FIG. 4 is a flowchart illustrating a method for tracking the position of the remote vehicle using the telematics system according to the second embodiment of the present invention.

The first embodiment illustrate a case where the authentication is performed in the service providing center 50, and the second embodiment illustrates a case where the authentication is performed in the telematics terminal 10.

Steps 401 to 405 of FIG. 4 are the same as the corresponding Steps 301 to 305 of FIG. 3. If the service providing center 50 receives a vehicle position track service request signal from the communication terminal 70 in Step 405, the service providing center 50 connects to the telematics terminal 10 in Step 407. If the service providing center 50 connects to the telematics terminal 10 in the Step 407, it transmits a vehicle position track request signal to the telematics terminal 10 in Step 409. The telematics terminal 10 receives the vehicle position track service request signal, and transmits an authentication request signal to the service providing center 50 in Step 411.

The service providing center 50 receives the authentication request signal, converts the received authentication request signal into an authentication request signal suitable to the communication terminal 70, and transmits the converted authentication request signal to the communication terminal 70 in Step 413. The communication terminal 70 receives the authentication request signal, and transmits the authentication password to the service providing center 50 in response to the received authentication request signal in Step 415. If so, the service providing center 50 transmits the authentication password to the telematics terminal 10 in Step 417.

The telematics terminal 10 receives the authentication password, and determines whether or not the received authentication is the same as a previously set authentication password. If it is determined that they are the same, the telematics terminal 10 controls the position information processor 18 and detects the position, generates the vehicle position information on the detected position, and transmits the generated vehicle position information to the service providing center 50 in Step 419-1. Thus, the service providing center 50 converts the vehicle position information suitably to the communication terminal 70, and transmits the converted vehicle position information to the communication terminal 70 in Step 420-1.

Whereas, if authentication fails in the Step 418, the telematics terminal 10 transmits an authentication failure message to the service providing center 50. If so, the service providing center 50 transmits the authentication failure message to the communication terminal 70.

After the transmitting of the vehicle position information, the service providing center 50 transmits a relevant organization notification or non-notification selection message for inquiring whether or not to transmit a theft report and the position information to the relevant organization, to the communication terminal 70 in Step 423. If the user selects a notification request to the relevant organization, the communication terminal 70 generates a relevant organization notification request message, and transmits the generated notification request message to the service providing center 50 in Step 425.

The service providing center 50 receives the relevant organization notification request message, and transmits a vehicle theft notification message to the relevant organization 80 in Step 427.

When the communication terminal 70 is the line telephone set 73, the service providing center 50 provides the vehicle position information to the telematics terminal 70 using the ARS, and when the communication terminal is the PC 71, the PDA 72, or the cell phone 74, the service providing center 50 provides the vehicle position information in voice, text or graphic to the telematics terminal 70 through a data communication using ARS or the wireless communication network. In the above description, there is described a case where when the vehicle position information is provided in voice, the ARS is used. However, instead of the ARS, a service representative can be also employed.

The present invention provides methods for preventing the vehicle thief from becoming aware of being currently tracked in position, or preparing a case where the thief turns off the power source of the telematics terminal 10 so as to prevent the position track. Descriptions will be made with reference to FIGS. 5 and 6 below.

Figure 5:
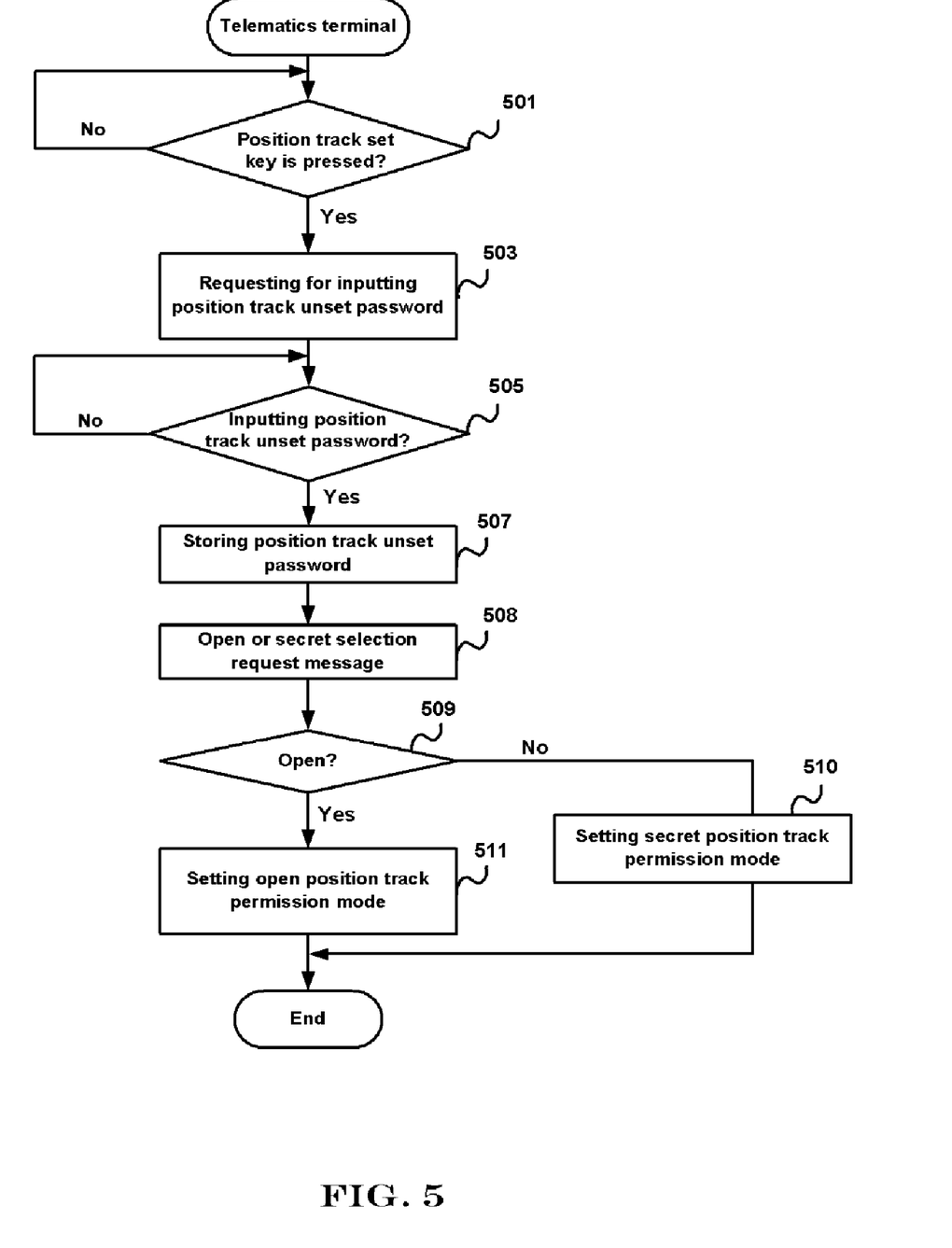
FIG. 5 is a flowchart illustrating a method for setting a remote position track mode in a telematics terminal according to an embodiment of the present invention.

FIG. 5 is a flowchart illustrating a method for setting a remote position track mode in the telematics terminal according to an embodiment of the present invention.

In the telematics terminal 10, the telematics controller 11 determines whether or not a position track set key is pressed on the key input unit 13. If it is determined that the position track set key is pressed, the telematics controller 11 displays a message of requesting to input a position track unset password, on the displaying unit 24 in Step 503. After requesting to input the position track unset password, the telematics controller 11 determines whether or not the position track unset password is inputted in Step 505. If it is determined that the position track unset password is inputted in the Step 505, the telematics controller 11 stores the position track unset password in Step 507, and displays an open or secret selection request message of requesting to select the open or secret of the remote position track on the displaying unit 24 in Step 508. After that, the telematics controller 11 determines whether the open or the secret is selected in Step 509. If it is determined that the open is selected, the telematics controller 11 is set in a public position track permission mode in Step 511. Otherwise, the telematics controller 11 is set in a non-public position track permission mode in Step 510.

Figure 6:
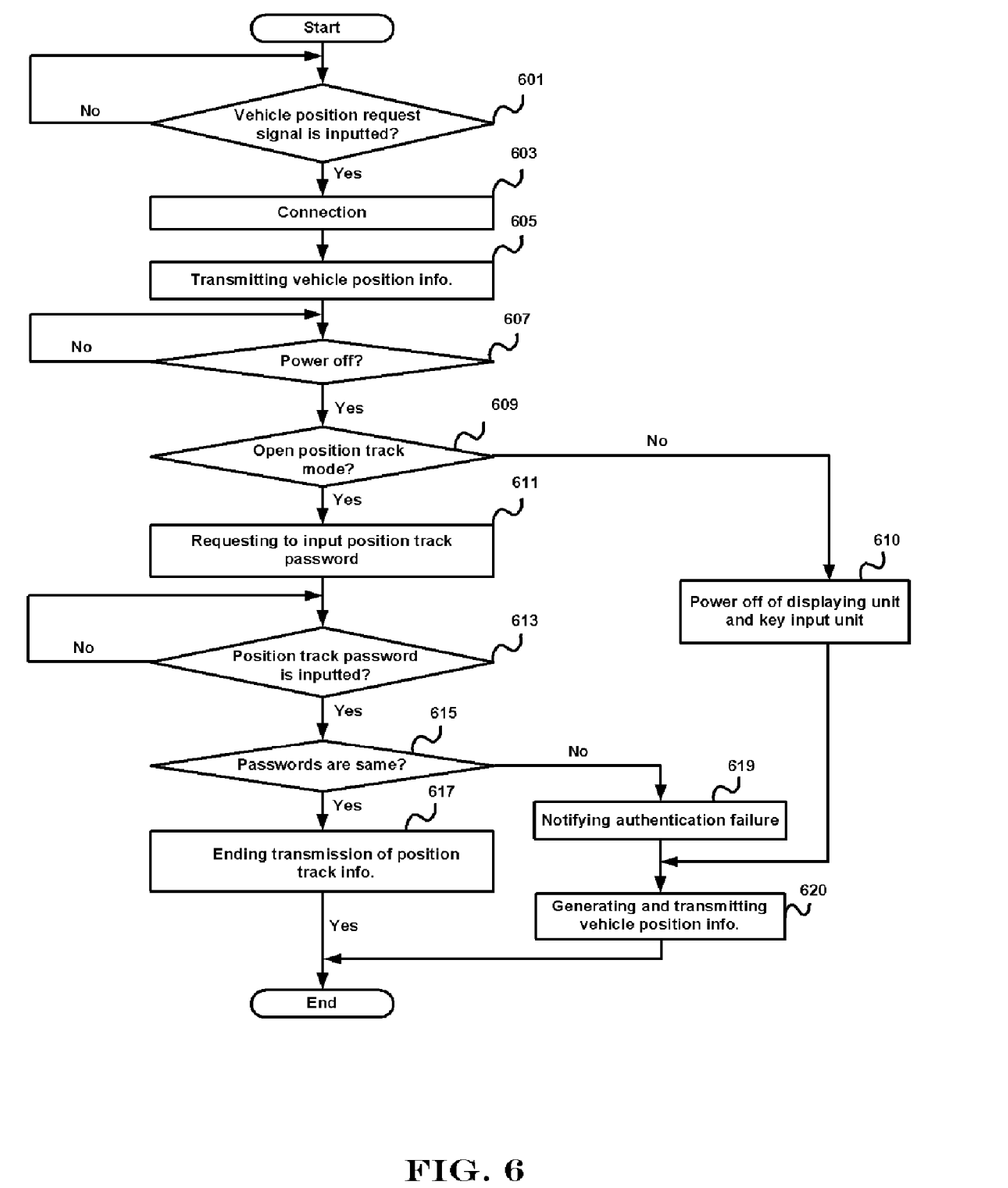
FIG. 6 is a flowchart illustrating a method for unsetting a remote position track mode in a telematics terminal according to an embodiment of the present invention.

FIG. 6 is a flowchart illustrating a method for unsetting the remote position track mode in the telematics terminal according to an embodiment of the present invention.

Describing below with reference to FIG. 6, the telematics controller 11 determines whether or not the vehicle position request signal is received from the service providing center 50 in Step 601. If it is determined that the vehicle position request signal is received in the Step 601, the telematics controller 11 connects with the service providing center 50 in Step 603. After that, the telematics controller 11 controls the position information processor 18 to detect a current position, generates the position information, and transmits the generated position information to the service providing center 50 in Step 605.

While generating and transmitting the vehicle position information, the telematics controller 11 determines whether or not the power key or a position track unset key is pressed on the key input unit 13 in Step 607.

If it is determined that the power key is pressed in the Step 607, the telematics controller 11 determines whether to be set in an open position track mode or in a secret position track mode in Step 609.

If the telematics controller 11 is set in the open position track mode, it displays a message of requesting to input a position track unset password, on the displaying unit 24 in Step 611.

The telematics controller 11 determines whether or not the position track unset password is inputted in response to the request for inputting the position track unset password in Step 613. If it is determined that the unset password is inputted in Step 613, it is determined whether or not the inputted unset password is the same as a previously set position track unset password. If it is determined that they are the same, the telematics controller 11 ends the transmission of the position track information and turns off the power source. In case where the pressed key is the position track unset key, the power source is not turned off.

Whereas, if it is determined that the telematics controller 11 is set in the secret position track mode in the Step 609, the telematics controller 11 turns off the power source only of the displaying unit 24, the key input unit 13, the vehicle diagnosing unit 14, and the constituent parts having no relation to the remote position track service in Step 610. This is to only seemingly appear that the power source is turned off. After the Step 610, the telematics controller 11 generates and transmits the vehicle position information to the service providing center 50 in Step 620.

If it is determined that the inputted unset password is not the same as the previously set position track unset password, the telematics controller 11 notifies the displaying unit 24 of authentication failure in Step 619, and then generates and transmits the vehicle position information to the service providing center 50. Otherwise, the telematics controller 11 ends transmission of the position track information, and turns off the power source in Step 617.

As described above, the present invention has an advantage in that since a vehicle owner can detect the position of his/her owning vehicle at the remote place, when the vehicle is stolen, the position information can be provided to the police station together with the theft report, and the police officer can be continuously provided with the position information while searching for the vehicle, and the vehicle thief is quickly caught.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A system for tracking a position of a remote vehicle using a telematics system, the system comprising:

a communication terminal for generating and transmitting a remote position track service request signal upon reception of a remote position track service request from a user, and informing the user of vehicle position information upon reception of the vehicle position information responsive to the remote position track service request signal;

a service providing center for receiving the remote position track service request signal and transmitting a remote position track service signal, and transmitting the vehicle position information to the communication terminal upon reception of the vehicle position information responsive to the remote position track service request signal; and a telematics terminal having a GPS (Global Positioning System) and a telematics controller, and receiving the remote position track service request signal, and detecting a vehicle position using the GPS to generate and transmit the vehicle position information to the service providing center, wherein the telematics controller is configured for the telematics terminal to receive a least power source for a remote position track even when a power source is turned off for other parts of the remote vehicle, wherein the telematics terminal is configured to perform the vehicle position track and power transmitting the position information from the telematics terminal even when the power source is turned off for other parts of the remote vehicle, wherein a displaying unit, a vehicle diagnosing unit, and a starter switch are configured not to be powered when the telematics terminal receives the least power source for the remote position track, wherein the communication terminal is away from the vehicle, and wherein the communication terminal initiates tracking of a position of the remote vehicle by generating and transmitting a remote position track service request signal while disconnecting powers to the displaying unit, the vehicle diagnosing unit, and the starter switch.

2. The system according to claim 1, wherein the service providing center stores a number and an authentication password of the telematics terminal, requests the communication terminal for authentication when receiving a remote vehicle position track service request signal from the communication terminal, receives an authentication password in response to the authentication request, compares the received authentication password with the stored authentication password, and performs the authentication depending on the comparison result.

3. The system according to claim 1, wherein the telematics terminal has its inherent authentication password, requests the communication terminal for authentication through the service providing center when receiving the remote vehicle position track service request signal from the communication terminal, receives an authentication password in response to the authentication request, compares the received authentication password with the inherent authentication password, and performs the authentication depending on the comparison result.

4. A method for tracking a position of a remote vehicle using a telematics system having a communication terminal, a service providing center and a telematics terminal, the method comprising the steps of:

when a user inputs a remote position track service request to the communication terminal, generating and transmitting a remote position track service request signal in the communication terminal;

in the service providing center, receiving the remote position track service request signal, and transmitting a vehicle position track request signal;

in the telematics terminal, receiving the remote position track request signal, detecting a vehicle position, generating vehicle position information, and transmitting the generated vehicle position information to the service providing center;

in the service providing center, receiving the vehicle position information, and transmitting the received vehicle position information to the communication terminal; and in the communication terminal, receiving the vehicle position information and informing the user of the received vehicle position information, wherein the telematics terminal is configured to receive a least power source for a remote position track even when a power source is turned off for other parts of the remote vehicle, wherein the telematics terminal is configured to perform the vehicle position track even when the power source is turned off for the other parts of the remote vehicle, wherein a displaying unit, a vehicle diagnosing unit, and a starter switch are configured not to be powered when the power source is turned off for the other parts of the remote vehicle, wherein the communication terminal is away from the vehicle, and wherein the communication terminal initiates tracking of a position of the remote vehicle by generating and transmitting a remote position track service request signal, while disconnecting powers to the displaying unit, the vehicle diagnosing unit, and the starter switch.

5. The method according to claim 4, wherein the service providing center stores a number and an authentication password of the telematics terminal, requests the communication terminal for authentication when receiving a remote vehicle position track service request signal from the communication terminal, receives an authentication password in response to the authentication request, compares the received authentication password with the stored authentication password, and performs the authentication depending on the comparison result.

6. The method according to claim 4, wherein the telematics terminal has its inherent authentication password, requests the communication terminal for authentication through the service providing center when receiving the remote vehicle position track service request signal from the communication terminal, receives an authentication password in response to the authentication request, compares the received authentication password with the inherent authentication password, and performs the authentication depending on the comparison result.

* * * * *